United States Patent
Brush et al.

(10) Patent No.: US 6,674,851 B1
(45) Date of Patent: Jan. 6, 2004

(54) SYSTEM AND METHOD FOR USING AN INTELLIGENT PERIPHERAL TO SUPPLY TELEPHONE SERVICE

(75) Inventors: Wesley A. Brush, Brick, NJ (US); James M. Carnazza, Rumson, NJ (US); Romel Khan, Eatontown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/371,811

(22) Filed: Aug. 11, 1999

(51) Int. Cl.[7] .......................... H04M 7/00; H04M 3/42; H04M 1/24
(52) U.S. Cl. .......................... 379/221.08; 379/201.01; 379/230; 379/34
(58) Field of Search .......................... 379/265.02, 230, 379/201.01, 34, 221.08; 455/422

(56) References Cited

U.S. PATENT DOCUMENTS

| | | | |
|---|---|---|---|
| 5,802,146 A | * 9/1998 | Dulman | 379/34 |
| 5,841,854 A | * 11/1998 | Schumacher et al. | 379/265.02 |
| 6,240,174 B1 | * 5/2001 | Silver | 379/230 |
| 6,374,102 B1 | * 4/2002 | Brachman et al. | 455/422 |
| 6,377,673 B1 | * 4/2002 | Cho et al. | 379/201.01 |

* cited by examiner

*Primary Examiner*—Harry S. Hong
*Assistant Examiner*—Thjuan P Knowlin
(74) *Attorney, Agent, or Firm*—Henry T. Brendzel

(57) ABSTRACT

A method for providing communication service in an Advanced Intelligent Network environment comprises receiving an alert message that originates from the database, the alert message including a protocol parameter; identifying a protocol that controls communication between the intelligent peripheral and the database in a protocol identified by the protocol parameter, the protocol being stored in a database in the IP containing a plurality of protocols and a plurality of protocol parameters, each protocol in the plurality of protocols being correlated with a unique protocol parameter from the plurality of protocol parameters; and executing the protocol.

40 Claims, 4 Drawing Sheets

SYSTEM AND METHOD FOR USING AN INTELLIGENT PERIPHERAL TO SUPPLY TELEPHONE SERVICE

FIELD OF THE INVENTION

The present invention relates to using an Intelligent Peripheral in a network. In particular, the present invention relates to systems and methods for using applications and features that are driven by an Intelligent Peripheral in a telephone-network environment.

BACKGROUND

Intelligent Peripherals (IP) are devices that perform services such as playing an announcement, collecting digits, recognizing voice commands, converting text to speech, recording and deleting a user-specific announcement, and verifying digits, for example, for callers who connect to a network through a switch. IP's can have bearer and signaling communication paths to switches, and have signaling communication paths to databases. FIG. 1 is an example of how an IP might be configured within a network. In this figure, IP 101 is connected to switch 102 via a signaling and bearer connection. Switch 102 is connected to database 103 via a signaling connection. The signaling connection can, for example, be part of the GR1129 protocol. Calling party 104 can dial a telephone number. This can result in a call-request received by switch 102, which can then signal database 103 with information about the caller. If database 103 determines that certain services are required (e.g., play announcement and collect caller digits), then database 103 can contact IP 101, via switch 102, asking IP 101 to perform the services. For example, the database can cause the IP to perform its particular function.

The capabilities of this embodiment are limited in that the switch and IP must use the same protocol (typically, the GR1129 and the GR1299 protocol). Additionally, in this embodiment, database 103 can only talk to IP 101 through switch 102, unnecessarily tying up switch 102.

FIG. 2 is another example of how an IP might be configured within a network. In this figure, IP 201 is connected to switch 202 for connection control only, but is connected directly to database 203 via a signaling connection for service control. The features of this embodiment are extremely limited, however, because a switch that uses the ITU-T protocol can not be an advanced intelligent network (AIN) switch. Thus, the services offered by the embodiment in FIG. 2 are limited to ITU-T services.

Regardless of the protocols used, it is thought that network performance might be improved if the IP-database-switch interaction were implemented in a way that is substantially protocol independent, and in a way that allows for direct communication between various components.

SUMMARY OF THE INVENTION

To alleviate the shortcomings in known systems, an embodiment of the present invention provides IP-database-switch interaction in a substantially protocol-independent way, while allowing for direct communication between the IP and the database.

In one embodiment of the present invention, a method provides communication service in an Advanced Intelligent Network environment, the communication service utilizing at least a database, an AIN switch and an intelligent peripheral (IP). An alert message is sent from the database to the IP. The alert message includes a parameter identifying an arbitrary protocol that is used for the IP and the database to communicate. The IP can have the ability to understand multiple protocols so that the AIN switch, the database and the IP can communicate in an efficient and flexible way. Once the IP is contacted, and a protocol is decided upon, the IP can establish a bearer connection with the switch. The IP can then receive instructions from the database to perform a service. Alternatively, the database and IP can send and receive instructions to perform the service prior to creating the bearer connection.

DETAILED DESCRIPTION

The present invention relates to systems and methods for performing telephony services. In particular, the present invention relates to using an advanced-intelligent-network (AIN) switch with a database and an intelligent peripheral (IP) in a way that is not limited by protocol constraints.

Figure 1:
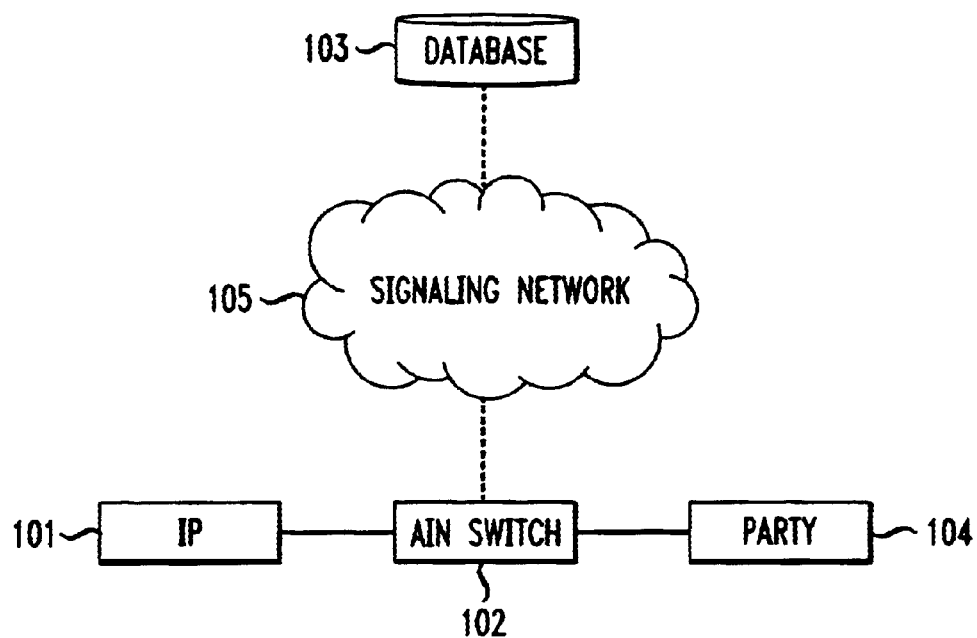
FIG. 1 is an overview of a known system featuring an intelligent peripheral, a switch, a network and a database.
Figure 2:
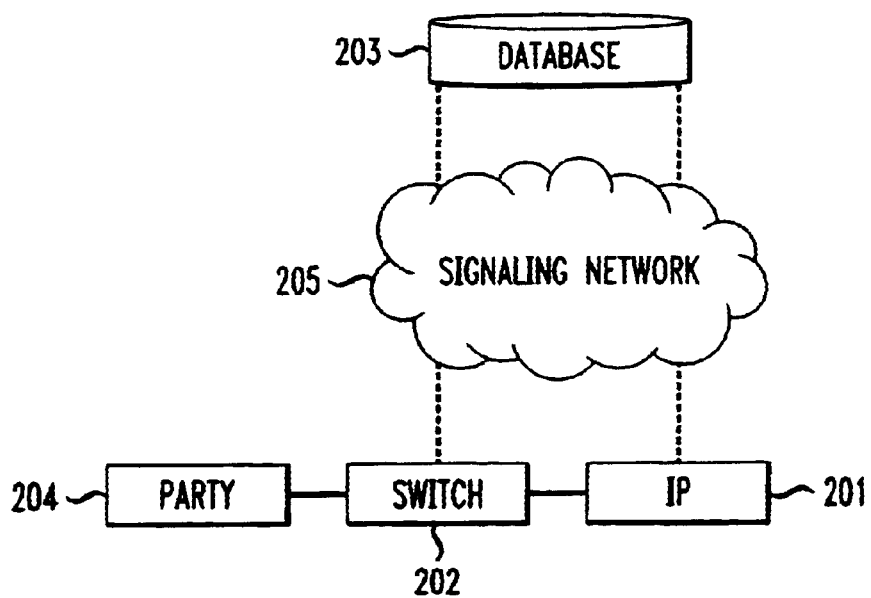
FIG. 2 is another overview of a known system featuring an intelligent peripheral, a switch, a network and a database.
Figure 3:
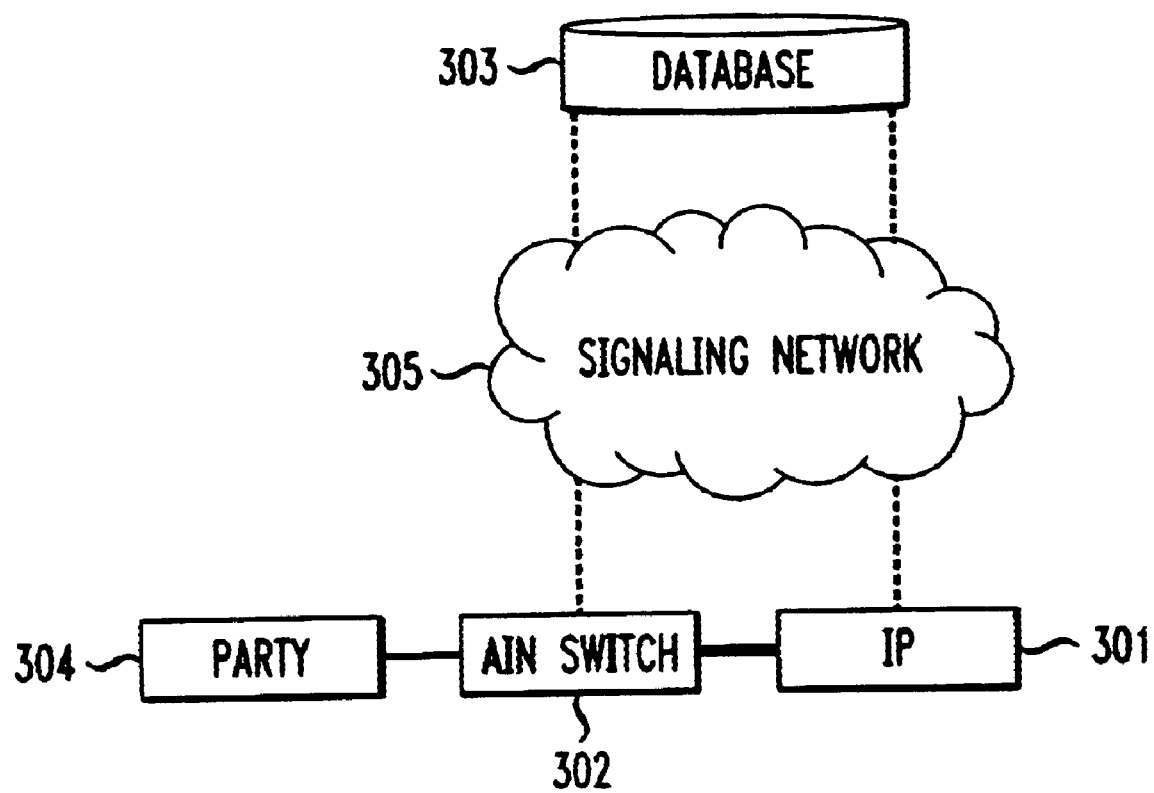
FIG. 3 is a system overview of an embodiment of the present invention having an intelligent peripheral, an advanced intelligent network switch and a database.

FIG. 3 is a system overview of an embodiment of the present invention. In this embodiment, AIN switch 302 can receive a call from party 304. AIN switch can also, via signaling network 305, send signaling messages to and receive signaling messages from database 303. Additionally, AIN switch 302 can send information to and receive information from IP 301.

Database 303 can send signaling messages to and receive signaling messages from AIN switch 302. Additionally, database 303 can send signaling messages to and receive signaling messages from IP 301, again via signaling network 305.

Finally, IP 301 can send information to and receive information from AIN switch 302, and can send signaling messages to and receive signaling messages from database 303. The interaction between IP 301 and AIN switch 302 can be via any combination of signaling and bearer connections.

As a contextual example, and still referring to FIG. 3, assume party 304 places a call that is routed through AIN switch 302. When AIN switch 302 receives the call, switch 302 sends information to database 303 regarding the call. Database 303 can then, using the received information, determine whether services are to be performed for that caller, and if so, what those services are.

Figure 4:
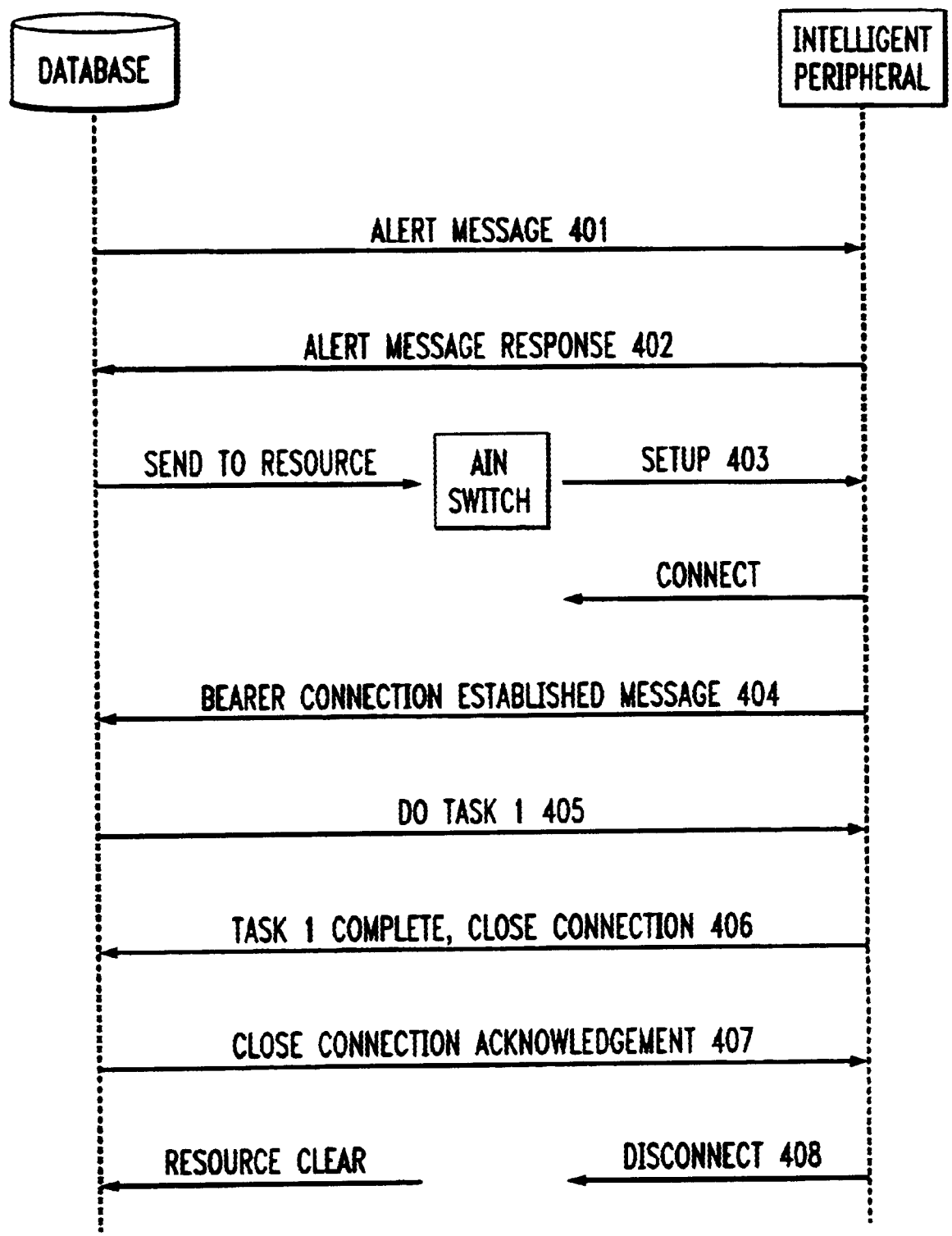
FIG. 4 is a data flow diagram of an embodiment of the present invention in which a database and an intelligent peripheral interact.

Once database 303 determines the services to be performed, database 303 contacts IP 301 to request the IP to perform the service. The data flow between database 303 and IP 301 typically begins with an alert message, shown in FIG. 4 as step 401. This alert message can contain information as to what protocol database 303 will use to interact with IP 301. IP 301 is protocol independent in the sense that, once database 303 informs it which protocol is to be used, IP 301 can use and understand that protocol.

At step 402, IP 301 can respond to the alert message, acknowledging receipt. At step 403, a signaling message is sent to AIN switch 302, informing switch 302 that it should connect with IP 301. Switch 302 can then send a setup signaling message to IP 301, requesting that IP 301 establish a bearer connection with switch 302. IP 301 then, based on this prompt from switch 302, establishes the bearer connection by sending a connect-signaling message to the AIN switch (step 403).

In the above embodiment, IP 301 establishes a bearer connection based on a prompt by switch 302. Alternatively, IP 301 can create a bearer connection without prompting from the switch. The establishment of the bearer connection can be based on information received from database 303.

At step 404, a message is sent from IP 301 to database 302 informing database 302 that a bearer connection has been established with switch 302. Then, at step 405, database 303 sends IP 301 a message requesting that IP 301 perform a task or tasks that make up the service. Once the task or tasks are performed, the database is informed at step 406, and the connection is closed between the database and the IP. This task-complete message is acknowledged at step 407. At step 408, IP 301 can then close the bearer connection with switch 302, and switch 302 can send a "resource clear" message to database 303.

Figure 5:
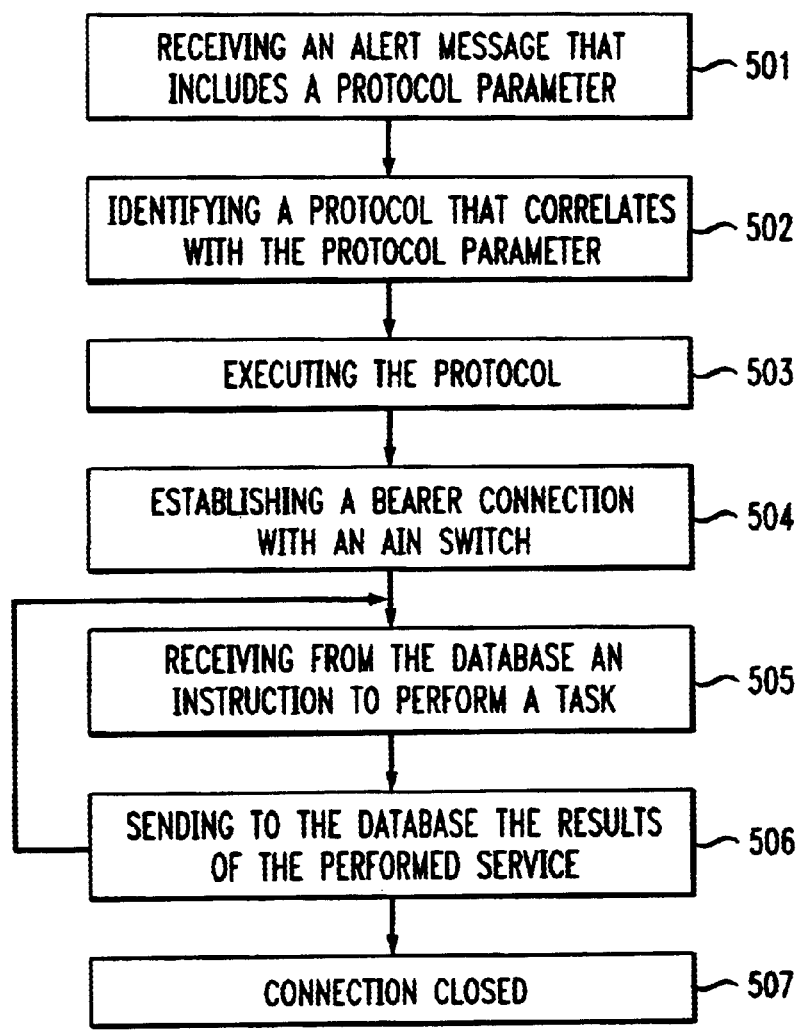
FIG. 5 is a flow chart depicting a method embodiment of the present invention.

FIG. 5 is a flow chart depicting a method according to an embodiment of the present invention. This embodiment is described from the perspective of the IP. It should be noted that the order in the flow chart is not meant to imply an explicit order to the steps; the steps of the method embodiments can be performed in any order that is practicable.

At step 501, the IP receives an alert message that includes a protocol parameter. The protocol parameter identifies the message as being sent from a database that uses a specific and known protocol. The IP has previously stored software modules that can be used to interact with the database; each software module includes instructions to interact with the database in a specific protocol. Each software module is stored in a database in the IP and correlated with a stored protocol parameter. Thus, when the IP receives from a database an alert message that includes a specific protocol parameter, the IP can select, using the database, the proper software module to interact with the database. For example, if the database requires interaction with the IP using the ITU-T protocol, the alert message sent by the database will include a parameter that allows the IP to understand that it is to use the ITU-T protocol in its interactions with the database. Thus, at step 502, a software component that correlates with the protocol parameter is identified. The IP can respond to the alert message by sending an acknowledgment signal.

At step 503, the software component is executed. That is, the IP is initialized to receive instructions from, and to report to, the database, using the desired protocol. Examples of some known protocols include SR3511 and ITU-T CS2 SRF-SCF operations.

At step 504, a first bearer connection is established with an AIN switch. At step 505, the IP receives instructions from the database to perform a service. In one embodiment of the present invention, the instructions are sent from the database directly to the IP. In another embodiment of the present invention, the instructions are sent to the IP via the AIN switch.

The IP can interact with the AIN switch using any known protocol. For example, the IP can interact with the AIN switch using existing GR1129 procedures. In one embodiment of the present invention, the AIN switch can prompt the IP to establish the bearer connection. The AIN switch can first send a setup-signaling message containing a correlation ID parameter. The IP then can send a connect-signaling message to establish a bearer connection. The IP can correlate the bearer connection to the signaling connection between the database and the IP by matching the correlation the ID parameter received in the setup signaling message from the AIN switch and the correlation ID parameter received from the database.

In another embodiment of the present invention, the IP can request establishment of the bearer connection unprompted, or prompted by the database. This bearer connection can be to a new party (this is equivalent to the IP dialing a new number) or the IP can request the AIN switch to bridge the bearer connection to the original party. The AIN switch is capable of bridging based on certain information such as a circuit identification code parameter received in a signaling message from the IP. Once the service is performed, then at step 506, the IP sends to the database the results of the performed service.

The services performed by the IP can include, but are not limited to, playing an announcement, collecting dual-toned multi-frequency (DTMF) signals, cancel playing an existing announcement, disconnecting the call, voice recognition, text-to-speech analyzing, collecting digits against a set of criteria or rules. It should be appreciated that, in known systems, the database would have to send distinct instruction packets to (I) request that a task be performed, (ii) cancel performance of the task, and (iii) perform a new task. In embodiments of the present invention, however, these distinct instructions can be merged into one package or message from the database to the IP. For example, in known systems, the database would have to send to the IP three distinct instruction packets to (I) cancel the performance of an ongoing task, (ii) perform a new task, and (iii) disconnect the call. In embodiments of the present invention, however, the IP can receive these three instructions in one package or message, and the IP has the intelligence to perform the service.

The IP can receive and perform any number of services. For example, the IP can receive, in one package or message, instructions to play a plurality of announcements, at least two of which will require the calling party to input DTMF signals. In response, the IP can send to the database, in a single package or message, multiple sets of collected DTMF signals from a calling party.

In addition to receiving and forwarding DTMF signals, the IP can analyze the DTMF signals based on rules received from the database. For example, assume the IP is to collect a ten-digit DTMF signal with the proviso that the caller not input "900" in the first 3 digits. If the caller does, in fact, input "900" as a DTMF signal, the IP can realize this and take an action such as, but not limited to, playing an error announcement or disconnecting the call. Likewise, the IP can receive an instruction from the database to play an announcement a predetermined number of times, or to play an announcement until a DTMF signal is received.

In one embodiment of the present invention, once a bearer connection is established between the IP and the AIN switch, the IP can create a plurality of second bearer connections with the switch based on instructions from the database. In this embodiment, the IP initiates a call-setup message to the AIN switch, and the calls are bridged through the IP to create a conference call. In one embodiment, a connection can be made to a IP peripheral for a first subset of the parties in an active multiparty call, and a bearer connection can be made to a second IP for a second subset of the parties in an active multiparty call.

The IP can receive instructions from the database such that, once the plurality of calls are bridged through the IP, the IP can perform a task or service for the first party, and perform a task or service for a second party who is part of the plurality of calls. The results of these performed services can be reported to the database. Once the IP has performed its services or tasks, it can pass the calls back to the switch and drop the bearer connection, freeing up the IP for other uses.

In one embodiment, while a multiparty call is in an active stage, the database can send to the AIN switch instructions in one package to cause the AIN switch to request establishment of bearer connections to different IPs for different subsets of the parties in the call.

Figure 6:
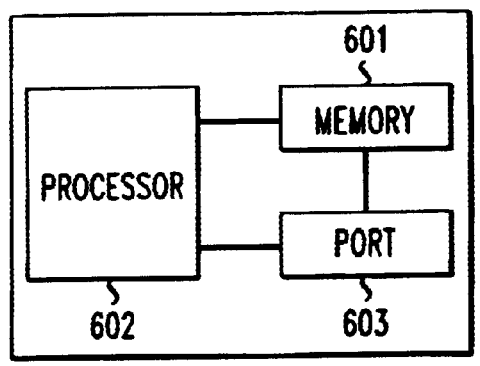
FIG. 6 is a block diagram of an apparatus according to an embodiment of the present invention featuring a processor, a port and a memory.

FIG. 6 is a block diagram of an apparatus embodiment of the present invention. In one embodiment, the apparatus includes processor 601, port 602 coupled to processor 601, and memory 603, also coupled to processor 601. Memory 603 can store instructions adapted to be executed by processor 601 to perform any method embodiment of the present invention. For example, memory 603 can store instructions adapted to be executed by a processor to receive an alert message that contains a protocol parameter, identify a protocol that correlates with the protocol parameter, and then execute the protocol.

For the purposes of this application, memory includes any medium capable of storing instructions adapted to be executed by a processor. Some examples of such media include, but are not limited to, RAM, ROM, floppy disks, CDROM, magnetic tape, hard drives, optical storage units, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for providing communication service in an Advanced Intelligent Network environment, the communication service utilizing at least a first database and an intelligent peripheral, the method comprising the steps of:
   (a) receiving an alert message that originates from the first database, the alert message including a parameter that specifies a communication protocol;
   (b) identifying a protocol that controls communication between the intelligent peripheral and the database in a protocol identified by the communication protocol parameter, the protocol being stored in a second database in the intelligent peripheral containing a plurality of protocols and a plurality of protocol parameters, each protocol in the plurality of protocols being correlated with a unique protocol parameter from the plurality of protocol parameters; and
   (c) executing the protocol.

2. The method of claim 1, further comprising:
   (d) establishing a bearer connection with an Advanced Intelligent Network switch, the bearer connection being correlated to the alert message;
   (e) receiving from the database an instruction to perform a service, the service to be performed via the bearer connection; and
   (f) performing the service.

3. The method of claim 2, further comprising the step of
   (g) sending to the database, via a direct communication path between the database and the intelligent peripheral, the results of the performed service.

4. The method of claim 2, wherein the service includes playing an announcement.

5. The method of claim 2, wherein the service includes collecting dual-toned multi-frequency signals.

6. The method of claim 3, wherein said receiving an instruction includes receiving, in one package, the following instructions in the following order:
   (i) cancel playing an existing announcement;
   (ii) play a new announcement; and
   (iii) disconnect the call.

7. The method of claim 2, wherein said receiving an instruction includes receiving, in one package, the following instructions in the following order:
   (i) if a task is being performed, canceling performance of that task; and
   (ii) performing a new task.

8. The method of claim 2, wherein said receiving an instruction includes receiving, in one package, instructions to play a plurality of announcements, at least two of which will require the calling party to input a dual-toned multi-frequency signal.

9. The method of claim 8, further comprising the step of
   (g) sending to the database, in a single package, multiple sets of dual-toned multi-frequency signals that are received from a calling party.

10. The method of claim 9, further comprising the steps of:
    (h) receiving, from the database, a set of rules for analyzing received dual-toned multi-frequency signals; and
    (i) analyzing received dual-toned multi-frequency signals according to the received rules.

11. A method for providing communication service in an Advanced Intelligent Network environment, the communication service utilizing at least a database and an intelligent peripheral, the method comprising:
    (a) receiving an alert message that originates from the database, the alert message including a protocol-identification parameter;
    (b) establishing a first bearer connection with an Advanced Intelligent Network switch, the bearer connection being correlated to the alert message;
    (c) creating a plurality of second bearer connections based on instructions from the database, the plurality of second bearer connections being bridged through the intelligent peripheral;
    (d) receiving from the database instructions to perform a first service for a party connected to the first bearer connection, and instructions to perform a second service for at least one party in the plurality of second bearer connections.

12. The method of claim 11 further comprising:
   (e) sending the results of at least one of the performed services to the database.

13. The method of claim 11, further comprising the steps of:
   (e) bridging all bearer connections through one end of the first bearer connection; and
   (f) disconnecting the bearer connection.

14. The method of claim 13, wherein said disconnecting the bearer connection is initiated by the intelligent peripheral.

15. An apparatus for providing communication service in an Advanced Intelligent Network environment, the communication service utilizing at least a database and an intelligent peripheral, the apparatus comprising:
   (a) a processor;
   (b) a port coupled to said processor;
   (c) a memory coupled to said processor, said memory storing instructions adapted to be executed on said processor, said instructions including:
      (i) receiving an alert message that originates from the database, the alert message including a protocol parameter;
      (ii) identifying in a database a protocol, the database correlating a plurality of protocols with a plurality of protocol parameters, the protocol controlling communication between the intelligent peripheral and the database in the protocol identified by the protocol parameter; and
      (iii) executing the protocol.

16. The apparatus of claim 15, wherein said memory stores further instructions adapted to be executed on said processor, said further instructions including:
   (iv) establishing a bearer connection with an Advanced Intelligent Network switch, the bearer connection being correlated to the alert message;
   (v) receiving from the database an instruction to perform a service, the service to be performed via the bearer connection; and
   (vi) performing the service.

17. The apparatus of claim 15 wherein the service includes playing an announcement.

18. The apparatus of claim 15 wherein the service includes collecting dual-toned multi-frequency signals.

19. The apparatus of claim 15, wherein said receiving an instruction includes receiving, in one package, the following instructions in the following order:
   (i) cancel playing an existing announcement;
   (ii) play a new announcement; and
   (iii) disconnect the call.

20. The apparatus of claim 15, wherein said receiving an instruction includes receiving, in one package, the following instructions in the following order:
   (i) if a task is being performed, cancel performance of that task; and
   (ii) perform a new task.

21. The apparatus of claim 15, wherein said receiving an instruction includes receiving, in one package, instructions to play a plurality of announcements, at least two of which will require the calling party to input a dual-toned multi-frequency signal.

22. The apparatus of claim 21, said memory storing further instructions adapted to be executed by said processor, said further instructions including:
   (iv) sending to the database, in a single package, multiple sets of dual-toned multi-frequency signals that are received from a calling party.

23. The apparatus of claim 22, said memory storing further instructions adapted to be executed by said processor, said further instructions including:
   (v) receiving, from the database, a set of rules for analyzing received dual-toned multi-frequency signals; and
   (vi) analyzing received dual-toned multi-frequency signals according to the received rules.

24. An apparatus for providing communication service in an Advanced Intelligent Network environment, the communication service utilizing at least a database and an intelligent peripheral, the apparatus comprising:
   (a) a processor;
   (b) a port coupled to said processor; and
   (c) a memory coupled to said processor, said memory storing instructions adapted to be executed by said processor, said instructions including:
      (i) receiving an alert message that originates from the database, the alert message including a parameter identifying a protocol to use for communications between the database and the intelligent peripheral;
      (ii) establishing a first bearer connection with an Advanced Intelligent Network switch, the bearer connection being correlated to the alert message;
      (iii) creating a plurality of second bearer connections based on instructions from the database, the plurality of second bearer connections being bridged through the intelligent peripheral; and
      (iv) receiving from the database instructions to perform a first service for a party connected to the first bearer connection, and instructions to perform a second service for at least one party in the plurality of second bearer connections.

25. The apparatus of claim 24, said memory storing further instructions adapted to be executed on said processor, said further instructions including:
   (v) sending the results of at least one of the performed services to the database.

26. The apparatus of claim 24, said memory storing further instructions adapted to be executed on said processor, said further instructions including:
   (v) bridging all bearer connections through at one end of the first bearer connection; and
   (vi) disconnecting the bearer connection.

27. A medium for providing communication service in an Advanced Intelligent Network environment, the communication service utilizing at least a database and an intelligent peripheral, the medium storing instructions adapted to be executed by a processor, the instructions comprising:
   (a) receiving an alert message that originates from the database, the alert message including a protocol parameter;
   (b) identifying in a database a protocol, the database correlating a plurality of protocols with a plurality of protocol parameters, the protocol controlling communication between the intelligent peripheral and the database in the protocol identified by the protocol parameter; and
   (c) executing the protocol.

28. The medium of claim 27, said medium storing further instructions adapted to be executed on said processor, said further instructions including:

(d) establishing a bearer connection with an Advanced Intelligent Network switch, the bearer connection being correlated to the alert message;

(e) receiving from the database an instruction to perform a service, the service to be performed via the bearer connection; and (f) performing the service.

29. The medium of claim 28, said medium storing further instructions adapted to be executed on a processor, said further instructions including:

(g) sending to the database, via a direct communication path between the database and the intelligent peripheral, the results of the performed service.

30. The medium of claim 28, wherein the service includes playing an announcement.

31. The medium of claim 28, wherein the service includes collecting dual-toned multi-frequency signals.

32. The medium of claim 28, wherein said receiving an instruction includes receiving, in one package, the following instructions in the following order:

(i) cancel playing an existing announcement;

(ii) play a new announcement; and (iii) disconnect the call.

33. The medium of claim 28, wherein said receiving an instruction includes receiving, in one package, the following instructions in the following order:

(i) if a task is being performed, canceling performance of that task; and (ii) performing a new task.

34. The medium of claim 28, wherein said receiving an instruction includes receiving, in one package, instructions to play a plurality of announcements, at least two of which will require the calling party to input a dual-toned multi-frequency signal.

35. The medium of claim 34, said medium storing further instructions adapted to be executed by a processor, said further instructions including:

(f) sending to the database, in a single package, multiple sets of dual-toned multi-frequency signals that are received from a calling party.

36. The medium of claim 35, said medium storing further instructions adapted to be executed by a processor, said further instructions including:

(g) receiving, from the database, a set of rules for analyzing received dual-toned multi-frequency signals; and (h) analyzing received dual-toned multi-frequency signals according to the received rules.

37. A medium for providing communication service in an Advanced Intelligent Network environment, the communication service utilizing at least a database and an intelligent peripheral, the medium storing instructions adapted to be executed by a processor, the instructions comprising:

(a) receiving an alert message that originates from the database, the alert message including a parameter identifying a protocol to use for communications between the database and the intelligent peripheral;

(b) establishing a first bearer connection with an Advanced Intelligent Network switch, the bearer connection being correlated to the alert message;

(c) creating a plurality of second bearer connections based on instructions from the database, the plurality of second bearer connections being bridged through the intelligent peripheral; and (d) receiving from the database instructions to perform a first service for a party connected to the first bearer connection, and instructions to perform a second service for at least one party in the plurality of second bearer connections.

38. The medium of claim 37, said medium storing further instructions adapted to be executed on a processor, said further instructions comprising:

(e) sending the results of at least one of the performed services tote database.

39. The medium of claim 37, said medium storing further instructions adapted to be executed on a processor, said further instructions comprising:

(e) bridging all bearer connections through at one end of the first bearer connection; and (f) disconnecting the bearer connection.

40. A method for providing communication service in an Advanced Intelligent Network environment, the communication service utilizing at least an AIN switch, a database and an Intelligent Peripheral, the method comprising:

(a) receiving, in one package, an instruction set from the database; and (b) requesting, based on the received instruction set, establishment of a bearer connection to a first intelligent peripheral for a first subset of the parties in an active multiparty call, and establishment of a bearer connection to a second intelligent peripheral for a second subset of the parties in an active multiparty call.

* * * * *